United States Patent [19]

Ueda et al.

[11] Patent Number: 5,160,399
[45] Date of Patent: Nov. 3, 1992

[54] LAMINATING APPARATUS

[75] Inventors: Noriyoshi Ueda; Kimiaki Hayakawa, both of Yokohama, Japan

[73] Assignee: Canon Kabushiki Kaisha, Tokyo, Japan

[21] Appl. No.: 585,181

[22] Filed: Sep. 20, 1990

[30] Foreign Application Priority Data

| Sep. 25, 1989 | [JP] | Japan | 1-246405 |
| Sep. 25, 1989 | [JP] | Japan | 1-246406 |
| Sep. 25, 1989 | [JP] | Japan | 1-246407 |
| Sep. 25, 1989 | [JP] | Japan | 1-246408 |
| Sep. 25, 1989 | [JP] | Japan | 1-246409 |
| Sep. 27, 1989 | [JP] | Japan | 1-253390 |

[51] Int. Cl.$^5$ .................. B32B 31/00; F26B 13/10
[52] U.S. Cl. .................. 156/359; 156/64; 156/378; 118/642; 34/52
[58] Field of Search ............ 156/64, 359, 378; 118/642, 643; 355/321, 324, 202; 34/4, 52, 56, 46; 430/138

[56] References Cited

U.S. PATENT DOCUMENTS

| 4,287,285 | 9/1981 | Mosehauer | 430/124 |
| 4,312,686 | 1/1982 | Smith et al. | 156/209 |
| 4,612,074 | 9/1986 | Smith et al. | 156/85 |
| 4,714,504 | 12/1987 | Cummings et al. | 156/64 |
| 4,723,129 | 2/1988 | Endo et al. | 346/1.1 |
| 4,740,796 | 4/1988 | Endo et al. | 346/1.1 |
| 4,952,960 | 8/1990 | Kosugi et al. | 354/299 |

FOREIGN PATENT DOCUMENTS 59-39583  3/1984  Japan .

Primary Examiner—David A. Simmons
Assistant Examiner—J. Sells
Attorney, Agent, or Firm—Fitzpatrick, Cella, Harper & Scinto

[57] ABSTRACT

A laminating apparatus comprises a sheet transporter for transporting a sheet, a laminating film transporter for transporting at least one laminating film in such a manner that the laminating film is superposed with at least one surface of the sheet transported by the sheet transporter, a pressing mechanism for pressing the sheet and the laminating film in a mutually superposed state, a dryer for drying the sheet before it is superposed with the laminating film, a humidity detector for detecting the humidity of the sheet, and a controller for controlling the dryer according to a detection signal from the humidity detector.

19 Claims, 9 Drawing Sheets

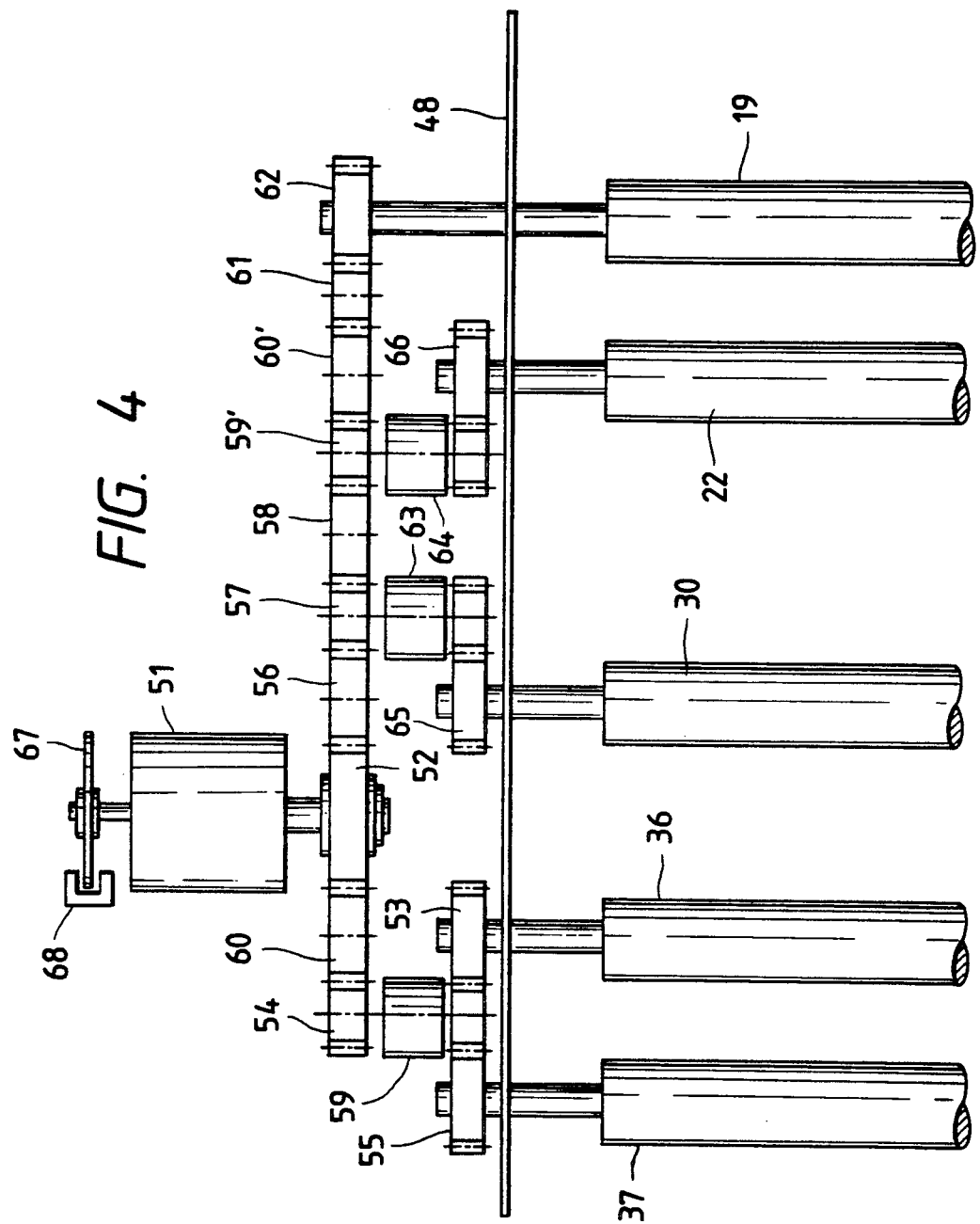

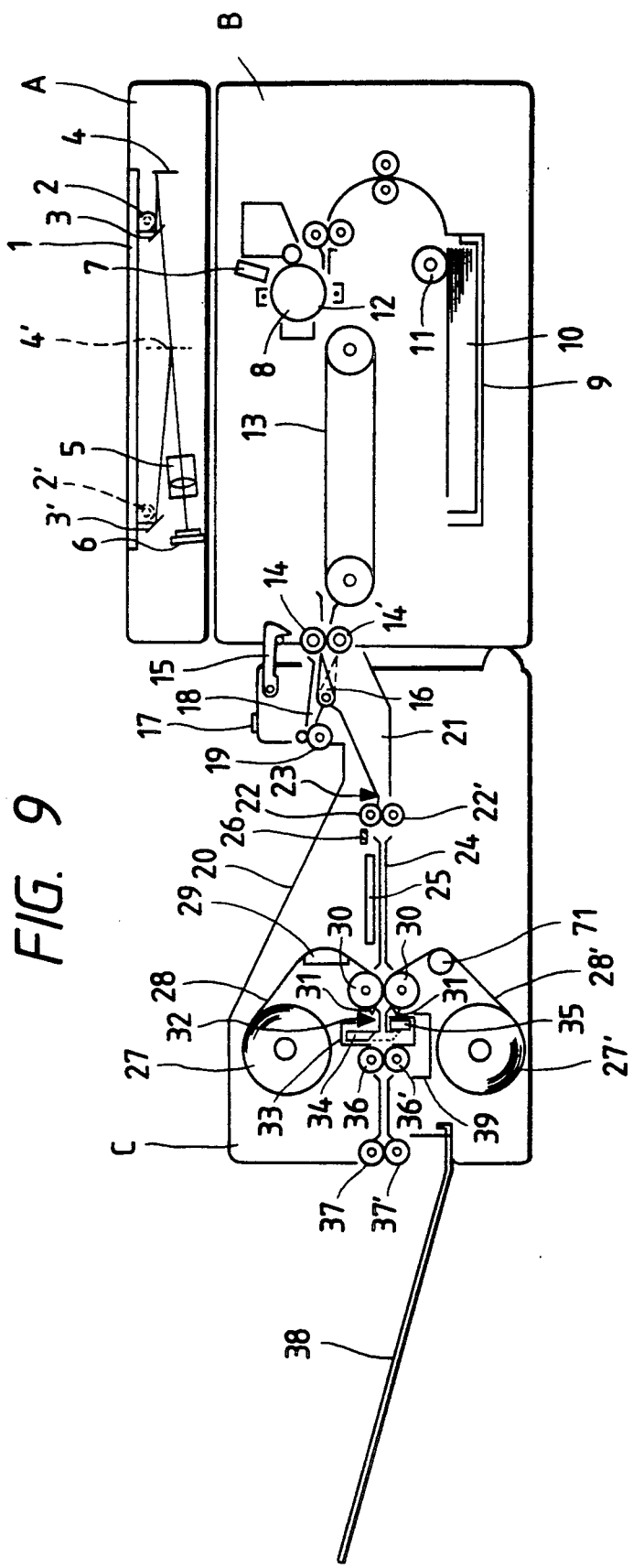

LAMINATING APPARATUS

BACKGROUND OF THE INVENTION

1. Field of the Invention

The present invention relates to an apparatus for lamination by sandwiching an object between upper and lower heat-reactive laminating films and applying heat and pressure thereto.

2. Related Background Art

Lamination is used for various objects for improving the appearance or preservability thereof. FIG. 10 shows a conventional laminating apparatus used for such lamination.

FIG. 10 is a longitudinal cross-sectional view of a conventional laminating apparatus, wherein shown are an upper heat-reactive laminating film 100 and a lower heat-reactive laminating film 100'. These films are respectively rolled as an upper sheet roll 101 and a lower sheet roll 101'. Said laminating films 100, 100' respectively wrap around a heating roller 102 and a pressure roller 102' and are pulled at the front ends by pull rollers 103, 103' for giving a predetermined tension to said films. At the centers of said heating roller 102 and pressure roller 102' there are respectively provided heaters 104, 104' for heating said rollers.

At the downstream side (left side in FIG. 10) of said pull rollers 103, 103', there is provided a cutter 105 for cutting the front and rear ends of the object after lamination.

A feed table 106 is provided for supporting an object 107 to be laminated, which is inserted, along the feed table 106, into the nip of the heating roller 102 and the pressure roller 102', where the upper laminating film 100 and the lower laminating film 100' mutually meet.

On said laminating apparatus there is provided an operation unit, including switches 108, 109 for manually setting the transporting speed of the heating roller 102, pressure roller 102' and pull rollers 103, 103', and the peripheral temperature of the heating roller 102 and pressure roller 102'.

However such conventional laminating apparatus has been associated with a drawback that lamination of satisfactory appearance cannot be obtained with a transfer sheet discharged from an image forming apparatus, because the transfer sheet immediately after discharge contains moisture (e.g. from the ink) and generates bubbles due to said moisture sealed between the laminating films.

On the other hand, if the transfer sheet is sufficiently dried, the laminating operation cannot be efficient because the process on the laminating apparatus cannot be conducted immediately.

SUMMARY OF THE INVENTION

In consideration of the foregoing, the object of the present invention is to provide a laminating apparatus capable of automatically laminating even a moist object to provide satisfactory appearance and within a short period time.

According to the present invention, the object to be laminated is sandwiched between upper and lower laminating films, and is sufficiently dried by heating prior to the laminating operation of said object and said laminating films, so that the lamination can be immediately conducted regardless of the moisture content of the object, even in case of a moist transfer sheet discharged from an image forming apparatus or the like.

In the foregoing embodiments, the density detecting sensor 26 for detecting the image density is employed as means for detecting the moisture level of the transfer sheet, but such embodiments are not limiting. For example, since the moisture content of the transfer sheet is dependent on the humidity of ambient air, the apparatus may be provided with a humidity sensor 150 (FIG. 5) for detecting the humidity of ambient air, and the control circuit 70 may be so constructed as to control the temperature of the sheet heater 25 according to a detection signal from said humidity sensor 150.

The moisture content of the transfer sheet can also be measured by the measurement of electric resistance thereof. It is therefore possible to provide two electrodes so as to contact the transfer sheet in the sheet cassette 9 or in the transport path, to enter the output of a resistance sensor 151 for detecting the resistance between said two electrodes into the control circuit 70, and to control the temperature of the sheet heater 25 by said control circuit 70 according to the output signal of said resistance sensor 151. With such structure, the apparatus of the present invention exhibits excellent performance even with a sheet on which the image is formed by image forming means other than the ink jet recording head.

BRIEF DESCRIPTION OF THE DRAWINGS

FIG. 4 is a developed view of a driving system of the laminating apparatus;

FIG. 9 is a longitudinal cross-sectional view of still another embodiment; and

DETAILED DESCRIPTION OF THE PREFERRED EMBODIMENTS

In the following there will be explained an embodiment of the present invention, with reference to the attached drawings.

Figure 1:
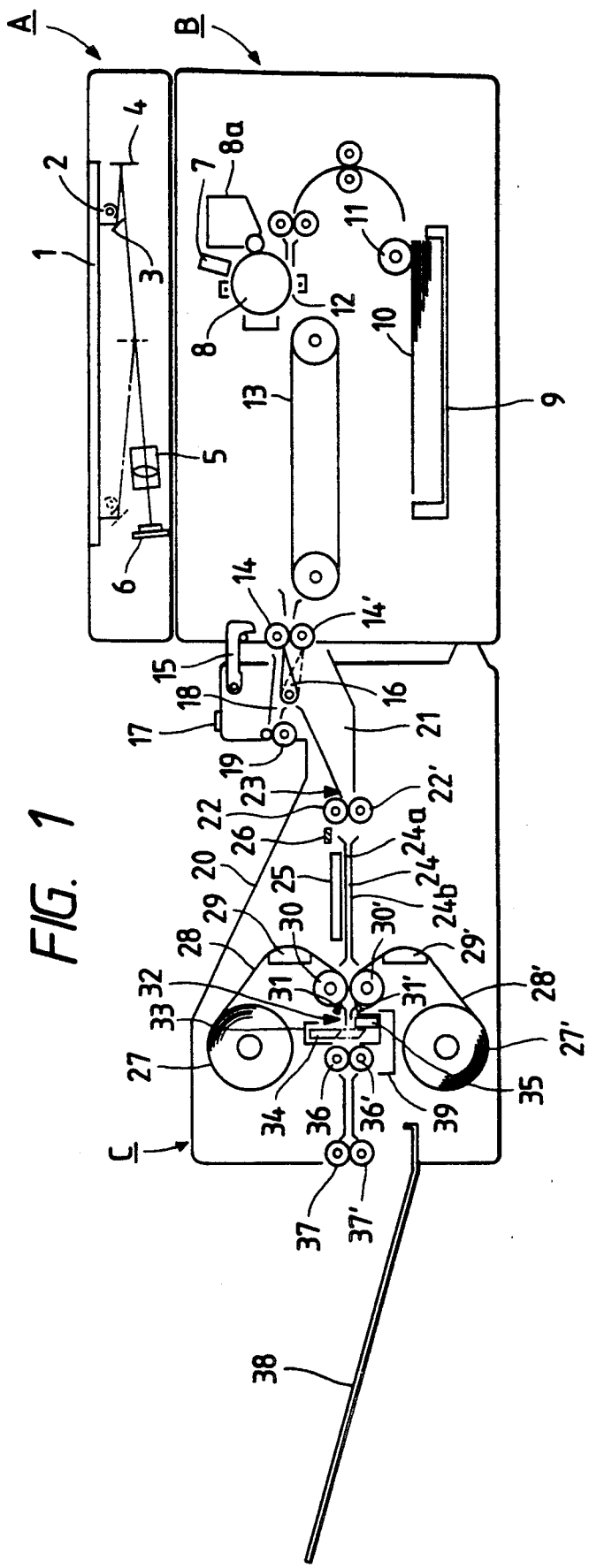
FIG. 1 is a longitudinal cross-sectional view of a laminating apparatus embodying the present invention, mounted on an image forming apparatus.

FIG. 1 is a longitudinal cross-sectional view of a laminating apparatus of the present invention, mounted on an image forming apparatus.

In a reader A, an original document placed on a platen glass 1 is illuminated by the light from an illuminating lamp 2, and the reflected light is guided by mirrors 3, 4 and focused by a lens 5 onto a CCD 6 for reading the original image. The image information of the image read by said reader A is transmitted to a printer B, and is recorded by a scanner 7 on a photosensitive drum 8 as an electrostatic latent image, which is developed by a developing unit 8a into a toner image.

On the other hand, transfer sheets 10 contained in a sheet cassette 9 in the printer B are fed one by one by a sheet feed roller 11, and the toner image on the photosensitive drum 8 is transferred, in a transfer unit 12, onto the transfer sheet 10, which is subsequently discharged from the printer B by a conveyor belt 13 and discharge rollers 14.

A laminating apparatus C of the present invention is detachably mounted, by a latch mechanism 15, on the main body of the image forming apparatus.

In said laminating apparatus, a flapper 16, driven by a solenoid 70 (FIG. 5), selects whether or not to effect lamination according to the state of a selector switch 17 (FIG. 5) provided in an operation unit on the outer casing of said laminating apparatus C. More specifically, in response to an instruction for non-lamination entered from the operation unit 7, the flapper 16 assumes a broken-line position in FIG. 1 to deflect the transfer sheet 10 to a non-lamination path 18, whereby said sheet 10 is discharged by discharge rollers 19 onto a sheet tray 20. On the other hand, in response to an instruction for lamination entered from the operation unit 17, the flapper 16 assumes a solid-line position in FIG. 1 to guide the sheet 10 into a lamination path 21 leading to a lamination unit.

As said discharged sheet tray 20 is provided on the upper face of the laminating apparatus C, constituting a part of the outer casing of said apparatus with open space above, the transfer sheets 10 stacked on said tray 20 can be easily removed. Also the space of the apparatus is reduced as said tray 20 is integrally constructed with the laminating apparatus C.

In FIG. 1, registration rollers 22, 22' are provided for adjusting the timing of the leading end of the transfer sheet 10 prior to the transfer to the laminating unit, and correcting skewed feed of the transfer sheet 10 released from the image forming apparatus, by forming a loop in the lamination path 21. Immediately in front of said registration rollers 22, 22', there is provided a pre-registration sensor 23, composed of a reflective photosensor, for detecting the edge of the transfer sheet 10.

A transfer path 24 for transferring the sheet 10 from the registration rollers 22, 22' to the laminating unit is composed of upper and lower guide plates 24a, 24b. Behind the upper guide plate 24a there is provided a sheet heater 25 for heating said upper guide plate 24a when said heater is on, whereby the sheet 10 is dried prior to the lamination. Said sheet heater 25 can be arbitrarily turned on or off by a selector switch of the operation unit 17, according to whether or not to heat the transfer sheet 10.

Between said registration rollers 22, 22' and the sheet heater 25 there is provided a density detecting sensor 26, composed of a photosensor, for detecting the density of the image on the sheet 10. The on/off control of said sheet heater 25 may be conducted according to the information on the image density.

Rolls 27, 27' of laminating films 28, 28' are respectively provided above and below. Laminating heaters 29, 29', for respectively heating said laminating films 28, 28', have a curved shape in order to heat said films over a wide area, and may be provided with sensors thereon for varying the heating temperature.

Pressure rollers 30, 30' are provided for pressing therebetween the laminating films 28, 28' heated by said heaters 29, 29' thereby laminating the transfer sheet 10. Separating fingers 31, 31' are constantly maintained in friction contact with the periphery of the pressure rollers 30, 30' for peeling the laminating films 28, 28' from the pressure rollers 30, 30' when said films stick to said rollers. At least one of said pressure rollers 30, 30' may be provided with a heater therein for simultaneously effecting heating and pressing.

A cutter unit 33, composed of a cutter blade 34, a die 35 and a cutter motor (not shown), is provided for cutting the front and rear ends of the laminated transfer sheet.

A lamination sensor 32, consisting of a reflective photosensor, is provided for detecting the front and rear ends of the laminated transfer sheet 10. Pull rollers 36, 36' have a peripheral speed larger than that of the pressure rollers 30, 30' so that the laminated transfer sheet 10 is subjected to a predetermined tension between said pull rollers 36, 36' and the pressure rollers 30, 30'.

Said sheet rolls 27, 27' are respectively given a load in the film drawing direction, so that the laminating films 28, 28' pulled by the pull rollers 36, 36' are given a tension between said pull rollers 36, 36' and the sheet rolls 27, 27' by means of the pressure rollers, 30, 30' and the heaters 29, 29'.

A waste case 39 is provided for receiving waste chips (laminated film area not containing the transfer sheet 10) of the laminating films 28, 28' cut by the cutter unit 33. Said case 39 can be pulled out forward from the apparatus, so that the waste chips in said case can be discharged when said case becomes full. Discharge rollers 37, 37' are provided for discharging the laminated transfer sheet 10 from the laminating apparatus C onto a laminate tray 38.

Figure 2:
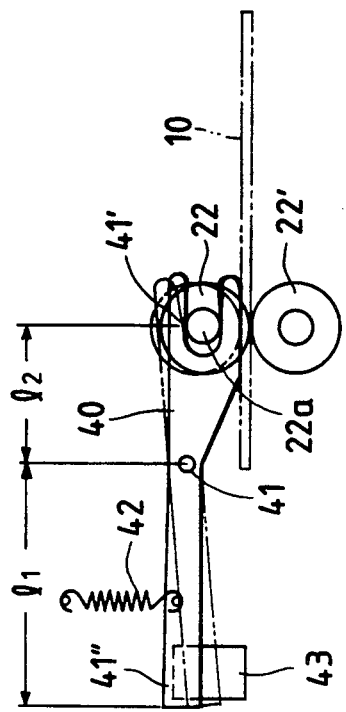
FIG. 2 is a lateral view of a sheet thickness detecting mechanism provided at registration rollers.

In the following the details of the units of the laminating apparatus C will be explained with reference to FIGS. 2 to 4.

A first there will be explained the details of the aforementioned registration rollers 22, 22' with reference to FIG. 2, which is a lateral view of a sheet thickness detecting mechanism provided at said registration rollers. The shaft 22a of the registration roller 22 engages with an end of a sheet thickness detecting lever 40, which therefore rotates about a rotating shaft 41 when the transfer sheet 10 enters the nip between the registration rollers 22, 22'. Said lever is provided with a lever flag 41'', and the lengths of arms of said lever 40 are so selected as to satisfy a relation $l_1 > l_2$, so that the amount of movement of the registration roller 22 is converted into an amplified amount of movement of said lever flag 41''. Opposed to said lever flag 41'' there is provided a sheet thickness sensor 43, composed of a photosensor, which linearly detects the amount of movement of the lever flag 41'', thereby detecting the thickness of the transfer sheet 10 passing through the nip of the registration rollers 22, 22'.

In the following there will be explained the details of the sheet rollers 27, 27'' with reference to FIGS. 3A, 3B which are partial cross-sectional views thereof. The sheet roll 27 is wound on a core 44 which is rendered rotatable on a roll shaft 47. Said roll shaft 47 is supported by a tension adjusting nut 49 on a lateral plate 48 of the laminating apparatus C. A tension regulating spring 50 is provided between said nut 49 and the core 44, so that the load against film drawing can be regulated by said tension adjusting nut 49.

Figure 3B:
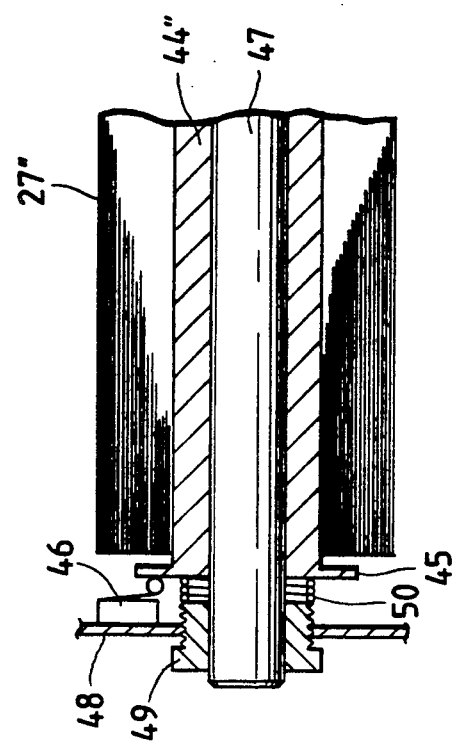
FIGS. 3A and 3B are partial cross-sectional views of a sheet roll.
Figure 3A:
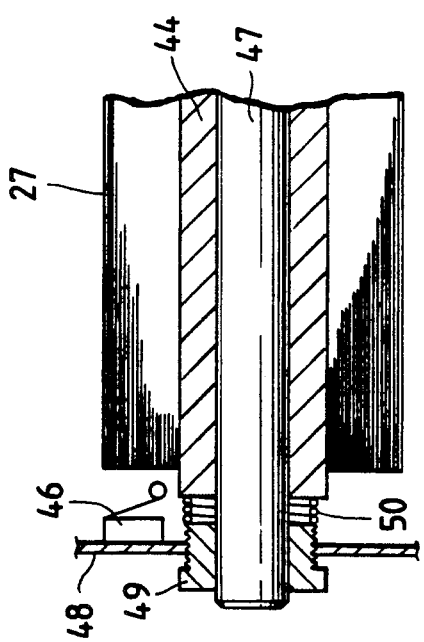

FIG. 3A shows the sheet roll 27 of the laminating film 28 of a first thickness, wound on a first core 44, while FIG. 3B shows the sheet roll 27'' of the laminating film 28'' of a second thickness, wound on a second core 44'.

The first core 44 has a straight end face, while the second core 44″ has a flange 45.

A microswitch 46, provided on the side plate 48 for discriminating the core, is turned off when the first core 44 is mounted but is pressed, thereby being turned on, by said flange 45 when the second core 44″ is mounted. The difference in thickness of the laminating film 28 or 28″ can be identified by the discrimination of the core 44 or 44″.

The present embodiment utilizes the discrimination of laminating films of two different thicknesses, but it is also possible to discriminate three or more different thicknesses of the laminating film by correspondingly varying the diameter of the flange 45 and increasing the number of microswitches 46.

In the following there will be explained the details of the driving system with reference to FIG. 4.

Referring to FIG. 4 which is a developed view of the driving system of the laminating apparatus C, a main motor 51 has a motor gear 52 on the output shaft whereby the rotation of said main motor 51 is transmitted through a motor gear 52, idler gears 60, 54 and a pull roller clutch 59 to a pull roller gear 53 and a discharge roller gear 55, thereby rotating the pull roller 36 and the discharge rollers 37. The rotation of said pull rollers 36 and discharge rollers 37 is controlled by said pull roller clutch 59.

Also the rotation of the main motor 51 is transmitted, through the motor gear 52, idler gears 56, 57, 58, 59′, 60′ and 61 to a discharge roller gear 62, thereby rotating the discharge rollers 19.

On the shaft of the idler gear 57 there is provided a pressure roller clutch 63, which is connected to a pressure roller gear 65, thereby controlling the rotation of the pressure rollers 30. Similarly the idler gear 59′ is provided, on the shaft thereof, with a registration roller clutch 64 which is connected to a registration roller gear 66 for controlling the rotation of the registration rollers 22.

On the shaft of the main motor 51 and opposite to the motor gear 52, there is provided a clock disk 67 having plural slits at a constant pitch, and a clock sensor, consisting of a transmissive photosensor, is provided in the vicinity of said clock disk 67 for detecting the slits.

In the following there will be explained the operation, in the laminating apparatus C of the present invention, of laminating the transfer sheet 10 discharged from the image forming apparatus.

At first a lamination switch, provided in the operation unit 17 on the laminating apparatus C, is depressed to energize a solenoid (not shown), whereby the flapper 16 assumes the solid-line state in FIG. 1 to guide the transfer sheet 10 from the image forming apparatus into the lamination path 21. At the same time the main motor 51 is activated to rotate the discharge rollers 19. The registration rollers 22, pressure rollers 30, pull rollers 36 and discharge rollers 37 remain stopped, as the clutches 64, 65, 59 are deactivated.

When the front end of the transfer sheet 10 is detected by the pre-registration sensor 23, the clock sensor 68 starts to count the clock pulses. When the clock sensor 68 counts a number of clock pulses corresponding to a time required by the transfer sheet 10 to impinge, at the front end thereof, on the nip of the registration rollers 22, 22′ and to form a predetermined amount of loop, the registration roller clutch 64 is energized whereby the transfer sheet 10 is introduced into the transfer path 24 by the registration rollers 22, 22′. The loop of the transfer sheet 10 formed in the lamination path 21 is maintained until the rear end of the transfer sheet 10 passes through discharge rollers 14 of the printer B.

When the clock sensor 68 detects that the front end of the transfer sheet 10 reaches a position $l+\alpha$ in front of the nip of the pressure rollers 30, 30′ in the transfer path 24, wherein l is the distance from said nip to the nearest position of the heaters 29, 29′, the pressure roller clutch 63 is turned on whereby the pressure rollers 30, 30′ start to rotate. The arrival of the front end of the transfer sheet 10 at a position of $l+\alpha$ in front of the nip of the pressure rollers 30, 30′ can be, detected, because the distance from the nip of said pressure rollers 30, 30′ to that of the registration rollers 22, 22′ is predetermined, by measuring the difference between said distance and $l+\alpha$ by the counting with the clock sensor 68 from the start of rotation of the registration rollers 22, 22′. Thus, the front end of the transfer sheet 10 becomes positioned by $\alpha$ behind the front end of the heated portion of the heaters 29, 29′, so that the front end of the transfer sheet 10 can be securely laminated.

Thus the transfer sheet 10, sandwiched between the heated upper and lower laminating films 28, 28′, is introduced together with said laminating film into the nip of the pressure rollers 30, 30′, and is subjected to lamination by the pressure applied by said rollers. When the front end of the laminated transfer sheet 10 is detected by the lamination sensor 32, the registration roller clutch 64 and the pressure roller clutch 63 are simultaneously turned off, whereby the movement of the transfer sheet 10 is terminated. At the same time the cutter motor (not shown) in the cutter unit 33 is turned on to move the cutter blade 34 downwards, thereby cutting the front end portion of the laminated transfer sheet 10. When the cutter blade 34 is completely retracted upwards after the cutting, the registration roller clutch 64, pressure roller clutch 63 and pull roller clutch 59 are turned on to activate the registration rollers 22, 22′, pressure rollers 30, 30′ and pull rollers 36, 36′.

Upon detection of the rear end of the transfer sheet 10 by the pre-registration sensor 23, the registration roller clutch 64 is turned off to terminate the rotation of the registration rollers 22, 22′ when the rear end of the transfer sheet 10 passes through the nip thereof. The clock sensor 68 is also used for measuring the amount of movement, from the detection of the rear end of the transfer sheet 10 by the pre-registration sensor 23 to the passing of the rear end of said sheet 10 through the nip of the registration rollers 22, 22′.

Upon detection of the rear end of the laminated transfer sheet 10 by the lamination sensor 32, the clock sensor 68 measures the sheet movement corresponding to the distance from said lamination sensor 32 to the cutter unit 33, and the pressure roller clutch 63 and the pull roller clutch 59 are turned off to terminate the movement of the laminated transfer sheet 10. At the same time, the cutter motor 71 is turned on to cut, with the cutter blade 34, the rear end portion of the laminated transfer sheet 10. After said cutting, the pull roller clutch 59 is turned on to activate the pull rollers 36 and the discharge rollers 37, whereby the laminated transfer sheet 10 is discharged and stacked on the laminate tray 38.

The transfer sheets 10 discharged in succession from the image forming apparatus can be laminated by the repetition of the above-explained procedure.

Figure 5:
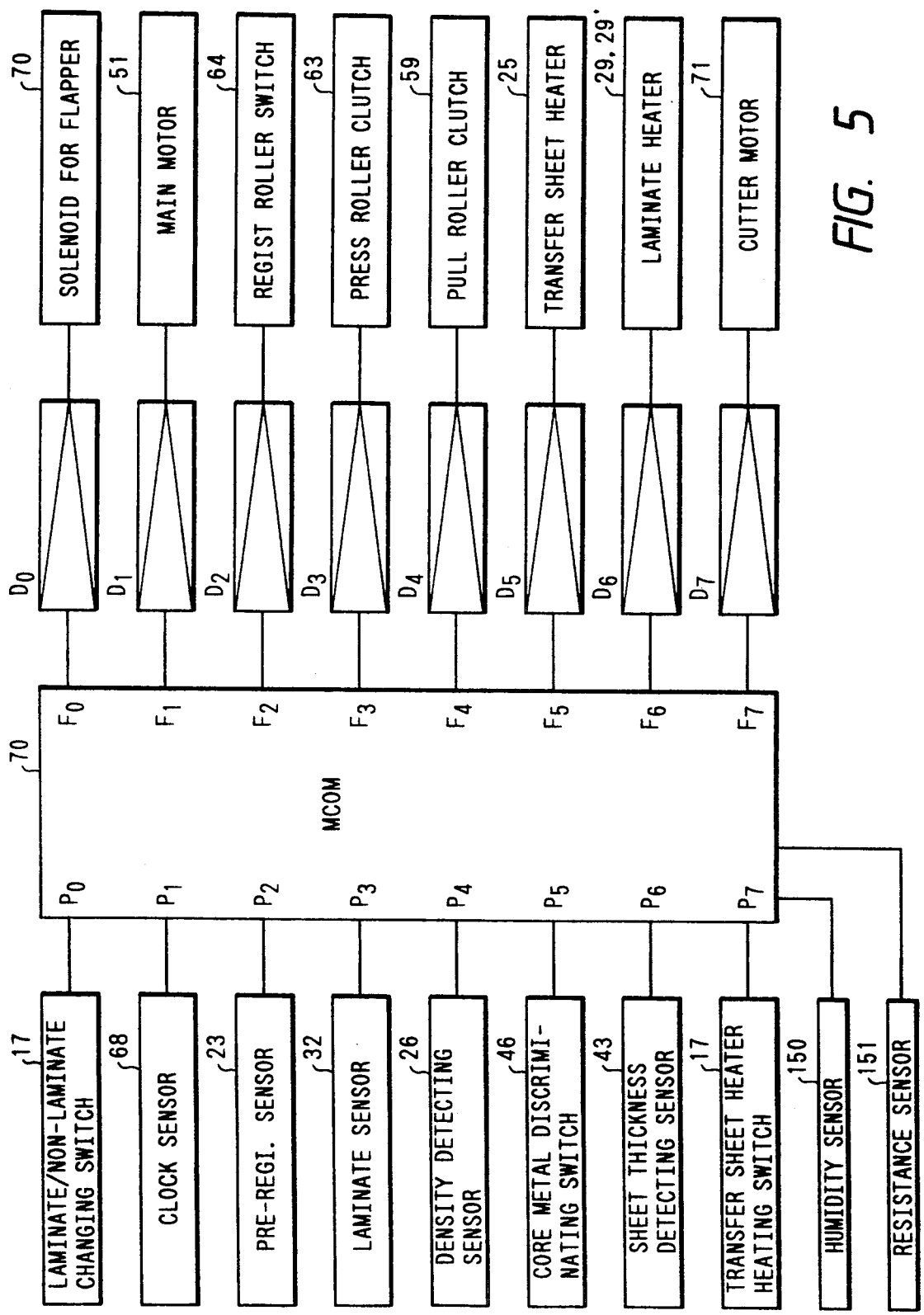
FIG. 5 is a block diagram of a control circuit, for explaining the function of the laminating apparatus.

FIG. 5 is a block diagram of a control circuit of the present embodiment. Said control circuit is principally composed of a known one-chip microcomputer (MCOM) 70 equipped with a ROM, a RAM etc., and input ports P0–P7 of said microcomputer 70 are respectively connected to the aforementioned lamination/-non-lamination selector switch 17; the clock sensor 68 for counting the amounts of movement of the rollers 19, 22, 22', 30, 30', 36, 36', 37 and 37', the pre-registration sensor 23 positioned immediately in front of the registration rollers 22, 22' for detecting the front and rear ends of the transfer sheet 10; the laminate sensor 32 positioned between the pressure rollers 30, 30' and the cutter unit 33 for detecting the front and rear ends of the laminated transfer sheet 10; the image density sensor 26 for detecting the image density of the transfer sheet 10 discharged from the image forming apparatus; the core discriminating switch 46 for discriminating the type of the core of the sheet roll 27 or 27' for identifying the thickness of the laminating film 28 or 28'; the sheet thickness sensor 43 for detecting the amount of displacement of the registration roller 22 thereby, identifying the thickness of the transfer sheet 10 passing through the registration rollers 22, 22'; and the switch 17 for the transfer sheet heater 25.

On the other hand, output ports F0–F7 respectively send signals, through drivers D0–D7, for on/off control of the solenoid 70 of the flapper 16 for selecting the lamination path or the non-lamination path; on/off control of the main motor 51 and the speed control thereof based on a predetermined speed according to the image density detected by the sensor 26, laminating film thickness detected by the core discriminating switch 46 and the thickness of transfer sheet detected by the sensor 43; on/off control of the registration roller clutch 64 for controlling the rotation of the registration rollers 22, 22'; on/off control of the pressure roller clutch 63 for controlling the rotation of the pressure rollers 30, 30'; on/off control of the pull roller clutch 59 for controlling the rotation of the pull rollers 36, 36' and the discharge rollers 37, 37'; on/off control of the sheet heater 25 for heating the transfer sheet prior to the lamination and temperature control therefor based on a predetermined temperature according to the change in the image density of the transfer sheet detected by the sensor 26; on/off control of the lamination heaters 29, 29' for heating the laminating films 28, 28' and control of surface temperature of said lamination heaters 29, 29' based on the image density detected by the sensor 26, film thickness detected by the core discriminating switch 46 and sheet thickness detected by the sensor 43; and on/off control of the cutter motor for cutting the laminated transfer sheet.

The fetching of input signals, on/off control of the loads, and load control based on the predetermined values are conducted according to a program stored in the ROM of the microcomputer 70.

In the following there will be explained speed control of the main motor 51.

In the lamination of the transfer sheet 10, the amount of heat absorption of said sheet 10 increases with the increase in density of the sheet 10. Stated otherwise, more heat is absorbed in a darker sheet. Consequently, if the heating condition of the laminating heaters 29, 29' for the laminating films 28, 28' is constant, the transport speed of said laminating films 28, 28' and of the transfer sheet 10 has to be made lower (by a slower rotating speed of the main motor 51), in order to obtain satisfactory lamination. Namely, in consideration of the amount of heat of the laminating films 28, 28' absorbed by the transfer sheet 10 at the pressure rollers 30, 30', it is necessary to increase the heat absorption of the sheet 10 by prolonging the heating time with the heaters 29, 29'.

Also the transport speed of the laminating films 28, 28' and the transfer sheet 10 has to be made slower for a larger thickness of the transfer sheet 10, as the amount of heat absorption of the transfer sheet 10 increases for a larger thickness.

Furthermore, said transport speed has to be made slower for a larger thickness of the laminating films 28, 28', since the amount of heat absorption of said films likewise increases.

Consequently, in the laminating apparatus C of the present embodiment, the transport speed of the transfer sheet 10 and the laminating films 28, 28' can be controlled according to the image density and thickness of the transfer sheet 10, and the thickness of the laminating films 28, 28', by feedback of the data from the density detecting sensor 26, sheet thickness sensor 43 and core discriminating switch 46 to the rotating speed of the main motor 51.

More specifically, as shown in FIG. 5, at least one of an image density signal detected by the density detecting sensor 26, a laminating film thickness signal detected by the core discriminating switch 46, and a sheet thickness signal detected by the sheet thickness sensor 43 is supplied to the control circuit 70, which in response discriminates the total heat capacity of the, transfer sheet and the laminating films. Thus the control circuit 70 controls the rotating speed of the main motor 51, thereby regulating the transport speed of the transfer sheet and the laminating films, in order to provide the laminating films, by means of the laminating heaters 29, 29', with thermal energy enough for lamination corresponding to said total heat capacity. Thus, for a large or small total heat capacity, the transport speed is respectively decreased or increased in order to provide the laminating films with larger or smaller amount of thermal energy.

In the following there will be explained temperature control of the laminating heaters 29, 29'.

Just like the speed control of the main motor 51 explained above, the temperature of the laminating heaters 29, 29' has to be controlled according to the image density of the transfer sheet 10 and thickness of said sheet 10 and of the laminating films 28, 28' because the amount of heat absorption by the laminating films 28, 28' varies. More specifically, the temperature of said heaters 29, 29' has to be elevated for increasing the amount of heat energy supply as the image density, thickness of the transfer sheet 10 or thickness of the laminating films 28, 28' increases.

Consequently, in the laminating apparatus C of the present embodiment, the temperature of the laminating heaters 29, 29' is feedback controlled by the data from the density detecting sensor 26, sheet thickness sensor 43 and core discriminating switch 46.

More specifically, as shown in FIG. 5, at least one of the image density signal detected by the density detecting sensor 26, the laminating film thickness signal detected by the core discriminating switch 46 and the sheet thickness signal detected by the sheet thickness sensor 43 is supplied to the control circuit 70, which in response discriminates the total heat capacity of the transfer sheet and the laminating films. Thus the control circuit 70 controls the temperature of the laminating heaters 29, 29', in order to provide the laminating films, by means of the laminating heaters 29, 29', with enough thermal energy for lamination corresponding to said total heat capacity. Thus, for a large or small total heat capacity, the temperature of the laminating heaters 29, 29' is respectively increased or decreased for increasing or decreasing the amount of thermal energy given to the laminating films.

The above-explained transport speed control and heater control corresponding to the thermal capacity of the transfer sheet and the laminating films may be employed singly or in combination.

In the following there will be explained on/off control and temperature control of the transfer sheet heater 25.

In image formation with ink in an image forming apparatus to be explained later in relation to FIG. 6, the transfer sheet 10 is discharged from said apparatus in a wet state with undried ink. If the sheet is laminated in such wet state, moisture will be sealed between the upper and lower laminating films 28, 28', thus forming bubbles and undesirably affect the appearance of the laminate. It is therefore necessary to heat the transfer sheet 10 prior to lamination, thereby evaporating the moisture therein.

However, excessive heating will cause curling of the transfer sheet 10, eventually leading to creases or curling of the obtained laminate. The wet level of the sheet 10 depends on the image density, and a higher image density is more inconvenient for lamination.

In the laminating apparatus of the present embodiment, therefore, the heating temperature can be automatically controlled according to the image density detected in advance by the density detecting sensor 26. More specifically, the temperature of the transfer sheet heater 25 is set higher or lower respectively for a higher or lower image density. On the other hand, certain image forming apparatus form the image with toner instead of ink, and the transfer sheet in such image forming apparatus is discharged in a dry state. In such case the heating prior to lamination is unnecessary. Consequently the operator can turn off the heater with a switch provided in the operation unit 17.

The transfer sheet heater is controlled in the following manner. The image density signal detected by the density detecting sensor 26 shown in FIG. 5 is supplied to the control circuit 70, which in response controls the temperature of the transfer sheet heater 25. In the foregoing embodiment there are employed heaters for drying the transfer sheet, but the drying may also be achieved by sending air to the surface of the transfer sheet for example with a fan, and the revolution of said fan is controlled in such case. Also the image density may be detected by a sensor for detecting the density of the original read by the reader A.

Figure 6:
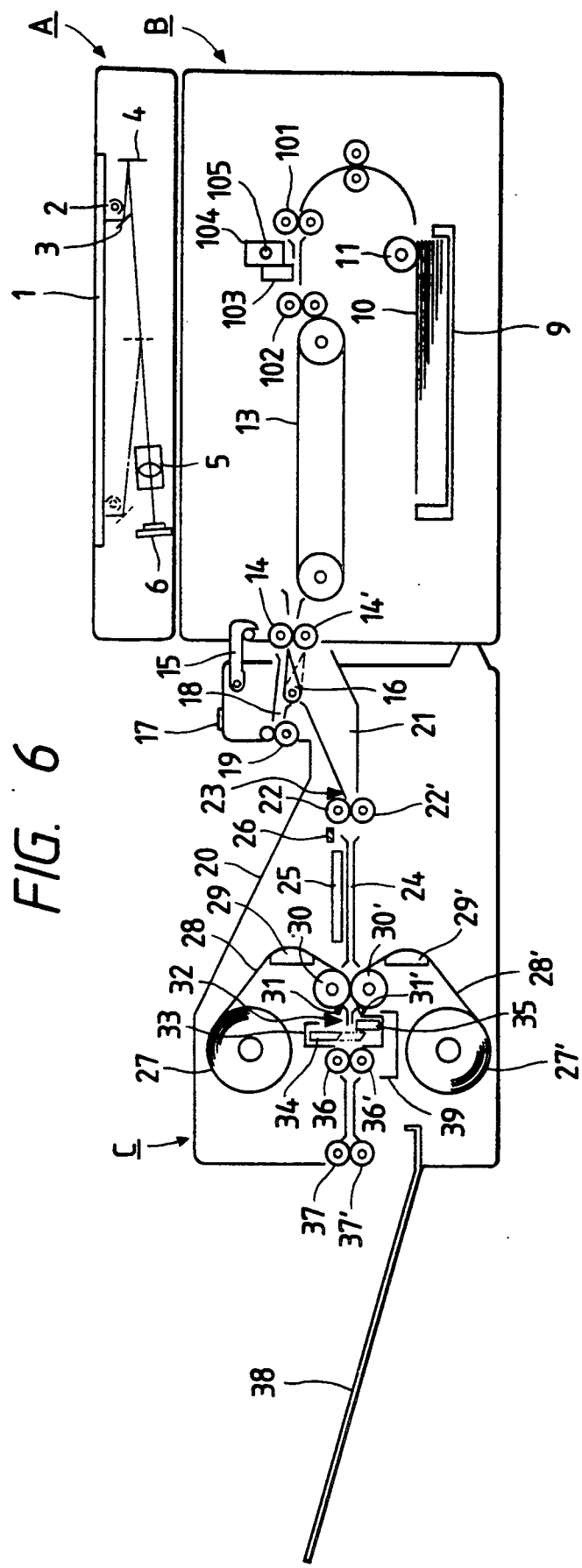
FIG. 6 is a longitudinal cross-sectional view of another embodiment of the present invention.

FIG. 6 shows an embodiment in which the image forming means of the printer B of the foregoing embodiment is replaced by an ink jet recording apparatus.

Referring to FIG. 6, there are shown rollers 101, 102 for transporting the transfer sheet; an ink jet head 103 for image formation by emitting ink droplets onto a sheet; and a carriage 104 supporting said ink jet recording head 103 and adapted to reciprocate along a guide member 105 in a direction perpendicular to the sheet transporting direction.

Figure 7:
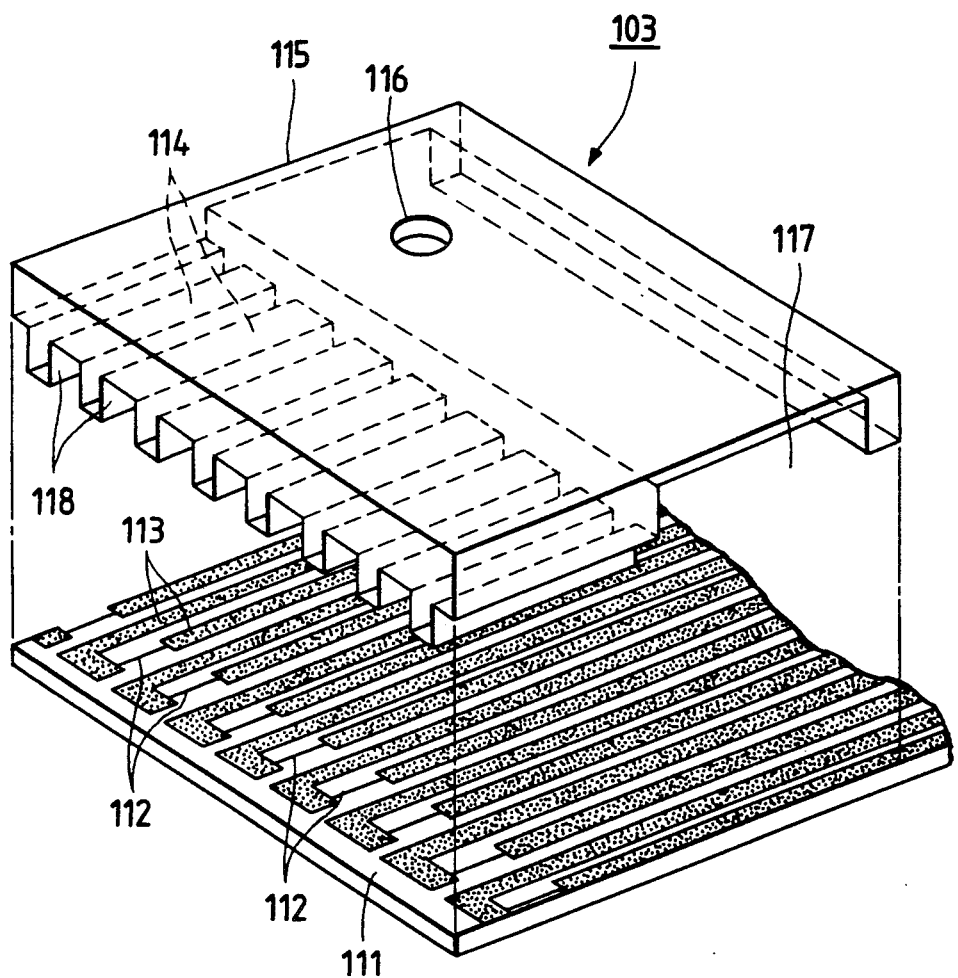
FIG. 7 is a perspective view showing the structure of a bubble jet recording head.

FIG. 7 shows a bubble jet recording head, as an example of the ink jet recording head, in an exploded perspective view.

Referring to FIG. 7, a heater board 111 is composed of a silicon substrate, provided thereon with electrothermal converters (discharge heaters 112), and electrodes 113 for example of aluminum for supplying said electrothermal converters with electric power. A recording head 103 is formed by adhering, to said heater board 111, a cover plate 115 having partitions for separating liquid paths 114 (nozzles) for the recording liquid. Also in a predetermined position of the apparatus, a replaceable ink cartridge is mounted for supplying said recording head 103 with the ink (recording liquid).

The ink supplied from said ink cartridge through a pipe is introduced, through a supply aperture 116 provided in the cover plate 115, into a common liquid chamber 117 of the recording head 103, and is further guided from said chamber into the nozzles 114. Said nozzles 114 are respectively provided with ink discharge apertures 118, which are arranged on a face of the recording head 103 opposite to the recording sheet, with a constant pitch in the sheet transporting direction.

In the present embodiment, recording is achieved by discharging the ink from the recording head 103 in synchronization with the movement of the carriage 104.

The principle of ink discharge in the aboveexplained bubble jet recording method is disclosed for example in the U.S. Pat. Nos. 4,723,129 and 4,740,796.

Figure 8A:
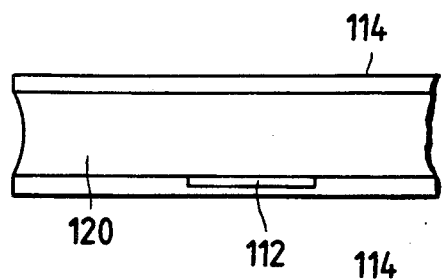
FIGS. 8A to 8G are views showing the working principle of the bubble jet recording head.
Figure 8B:
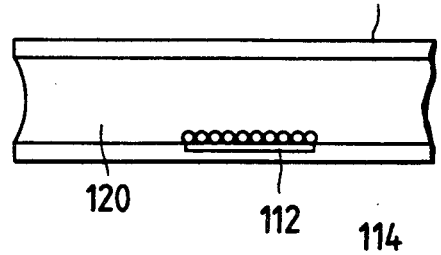
Figure 8C:
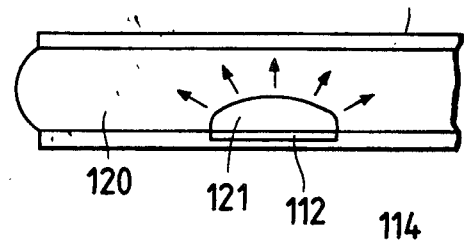

Said principle will be briefly explained with reference to FIGS. 8A to 8G. In a stationary state shown in FIG. 8A, the ink 120 filled in the nozzle 114 is in equilibrium of the surface tension and the external pressure at the face of discharge opening. In order to discharge the ink 120 from this state, electric power is supplied to the electrothermal converter 112 in the nozzle 114, thereby inducing rapid temperature increase exceeding nucleus boiling in the ink in said nozzle 114. Thus, as shown in FIG. 8B, the ink positioned adjacent to the electrothermal converter 112 generates small bubbles by heating, and is gasified to generate membrane boiling, whereby said bubbles 121 grow rapidly as shown in FIG. 8C.

Figure 8D:
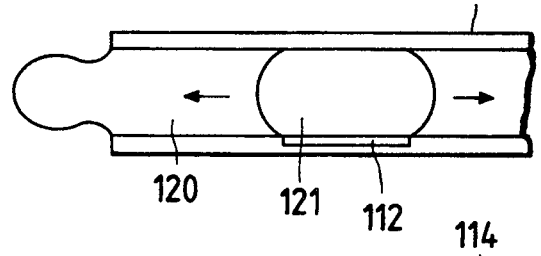
Figure 8E:
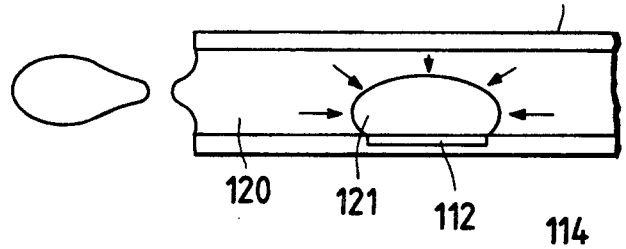
Figure 8F:
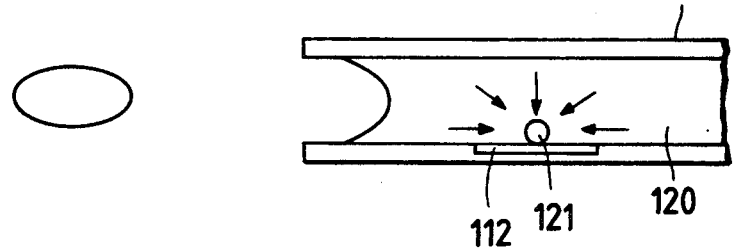
Figure 8G:
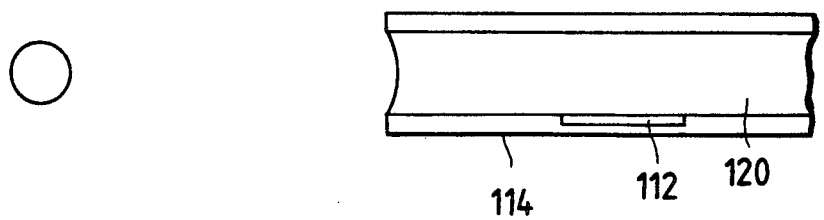
Figure 10:
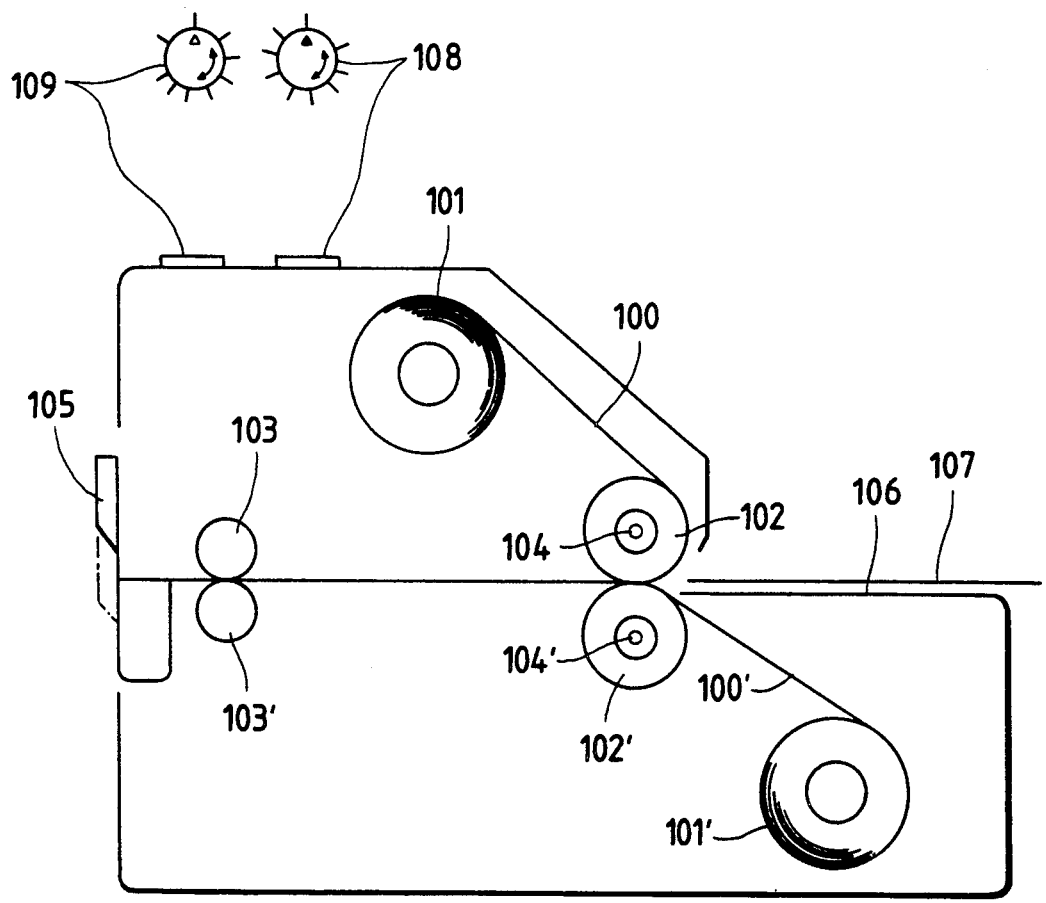
FIG. 10 is a longitudinal cross-sectional view of a conventional laminating apparatus.

When the bubble 121 grows to a maximum as shown in FIG. 8D, an ink droplet is pushed out from the discharge opening of the nozzle 114. When the power supply to the electrothermal converter 112 is terminated, the bubble 121 contracts as shown in FIG. 4E by cooling with the ink 120 in the nozzle 114, and an ink droplet is discharged by the growth and contraction of said bubble. The electrothermal converter 112 is rapidly cooled in contact with the ink, whereby the bubble 121 either disappears or contracts to a negligible volume, as shown in FIG. 8F. Upon said contraction of the bubble 121, the ink is replenished by capillary action into the nozzle 114 from the common liquid chamber 117, as shown in FIG. 8G, thereby preparing for the next electric power supply.

Thus an ink image is recorded on the recording sheet, by energization of the electrothermal converters 112 according to image signals and in synchronization with the reciprocating motion of the carriage 104.

In the above-explained ink jet recording method, recovery means is preferably provided at an end portion of the moving range of the carriage. Said recovery means serves to prevent ink drying or solidification in the vicinity of discharge openings of the recording head 103, by covering the ink discharge face of said recording head 103 in the non-recording state. Also said recovery means may be connected to a pump for sucking ink out of the discharge openings, for the purpose of rectifying or preventing ink discharge failure.

Also in the embodiment shown in FIGS. 6 to 8, as in the foregoing embodiments, the control circuit shown in FIG. 5 controls the transport speed of the recording sheet, the laminating heaters 29, 29' and the sheet heater 25.

In the foregoing embodiments there are provided the laminating films on both sides of the transfer sheet, but there may be provided only one laminating film on a side (image bearing face) of the transfer sheet.

Also the laminating heaters 29, 29' and the sheet heater 25 are controlled by temperature in the foregoing embodiments, but the method of control is not limited to such embodiments and can be controlled in any manner as to vary the amount of thermal energy supply. For example, the amount of thermal energy supply may be varied by varying the number of energized ones in plural heaters.

FIG. 9 shows another embodiment, which is different from the foregoing embodiments shown in FIGS. 1 to 6, in that pressure-sensitive adhesive is employed in one of the laminating films.

In FIG. 9, a laminating film roll 28 employs heat-sensitive adhesive coated on the external surface, while a laminating film roll 28' employs pressure-sensitive adhesive coated on the external surface. A laminating heater 29 is provided for heating the heat-sensitive laminating film 28, which becomes adhesive upon heating. Said heater 29 has a curved surface for heating the film over a wide area. The temperature of said heater is rendered variable by a sensor provided at the surface of said heater.

Pressure rollers 30, 30' effect the lamination of the recording sheet, by pressing said sheet between the laminating film 28 heated by the laminating heater 29 and the laminating film 28' coated with the pressure-sensitive adhesive. Said laminating film 28' coated with the pressure-sensitive adhesive becomes adhesive by the pressure exerted by the pressure rollers 30, 30'. A guide roller 71 is provided for guiding the laminating film 28'.

In the present embodiment, the heat-sensitive laminating film with glossy surface is adhered to the image bearing face of the recording sheet, while the non-glossy pressure-sensitive laminating film of low rigidity, not requiring heating, is adhered to the image-free face, which is less affected by the draw-backs of the laminating film, whereby the electric power consumption of the laminating apparatus can be reduced without undesirable influence on the image bearing face.

Other structures and controls of the present embodiment are same as those in the foregoing embodiments shown in FIGS. 1 and 6.

In the above-mentioned embodiment, the density detecting sensor 26 which detects density of image is used for means for detecting humidifed degree of the transfer sheet. However, it is possible to provide a temperature sensor 150 (FIG. 5) which detects the humidity in the area surrounding on the apparatus since the transfer sheet gets humid in response to humidity so that control circuit 70 controls humidity of the transfer sheet heater 25 in response to the detected signal of the humidity sensor 150.

In addition, it is possible to measure electric resistance of the transfer sheet to check humidified degree. Concretely, two electrodes are provided so as to contact the transfer sheet in the cassette 9 or in the conveying path, out-put of the resistance sensor 151 which detects resistance between both electrodes is inputted to the control circuit 70, so that the control circuit 70 controls humidity of transfer sheet heater 25 in response to the outputted resistance signal. According to such construction, the present invention can be applied to the sheet on which image is formed by the image forming means other than the ink jet system.

What is claimed is:

1. A laminating apparatus, comprising:
   laminating film transporting means for transporting at least one laminating film in such a manner that the laminating film is superposed with at least one surface of the sheet to be laminated;
   pressing means for pressing the sheet and the laminating film in a mutually superposed state;
   drying means for drying the sheet before it is superposed with the laminating film;
   humidity detecting means for detecting moisture content in the sheet; and
   control means for controlling said drying means based on detection by said humidity detecting means.

2. A laminating apparatus according to claim 1, wherein said laminating film transporting means is adapted to support the laminating film and the sheet in mutually superposed state.

3. A laminating apparatus according to claim 2, wherein said laminating film transporting means comprises a pair of rollers.

4. A laminating apparatus according to claim 3, further comprising laminating film heating means for heating the laminating film, said film heating means being provided in at least one of said pair of rollers so as to heat the laminating film.

5. A laminating apparatus according to claim 1, further comprising laminating film heating means for heating the laminating film, film heating means being adapted to heat the laminating film prior to pressing by said pressing means.

6. A laminating apparatus according to claim 1, wherein said humidity detecting means detects the moisture content in the sheet by means of electric resistance thereof.

7. A laminating apparatus according to claim 1, wherein said humidity detecting means detects the moisture content in the sheet by means of density of image formed on the sheet.

8. A laminating apparatus according to claim 1, wherein said drying means comprises sheet heating means for heating the sheet.

9. A laminating apparatus according to claim 8, wherein said control means controls said sheet heating means in such a manner as to increase the amount of thermal energy supply as the humidity detected by said humidity detecting means increases.

10. A laminating apparatus according to claim 8, wherein said drying means comprises sheet transporting means for transporting the sheet while it is heated by said sheet heating means.

11. A laminating apparatus according to claim 10, wherein said control means controls said sheet transporting means in such a manner as to decrease the transporting speed thereof as the humidity detected by said humidity detecting means increases.

12. A laminating apparatus according to claim 7, wherein said density detecting means has a photosensor.

13. A laminating apparatus according to claim 1, wherein said drying means has a fan for sending air to the surface of the sheet.

14. An image forming apparatus, comprising:

image forming means for forming an image on a sheet;

sheet transporting means for transporting the sheet subjected to image formation by said image forming means;

laminating film transporting means for transporting at least one laminating film in such a manner that the laminating film is superposed with at least the image bearing face of said sheet transported by said sheet transporting means;

pressing means for pressing the sheet and the laminating film in a mutually superposed state;

drying means for drying the sheet before it is superposed with the laminating film;

humidity detecting means for detecting moisture content of the sheet; and control means for controlling said drying means based on detection by said humidity detecting means.

15. An image forming apparatus according to claim 14, wherein said image forming means comprises a recording head for image formation by ink discharge onto the sheet.

16. An image forming apparatus according to claim 15, wherein said recording head is adapted to effect ink discharge by thermal energy.

17. An image forming apparatus according to claim 14, wherein said humidity detecting means detects the moisture content of the sheet by the density of image formed on the sheet.

18. An image forming apparatus according to claim 14, wherein said drying means comprises sheet heating means for heating the sheet.

19. An image forming apparatus according to claim 18, wherein said control means controls said sheet heating means in such a manner as to increase the amount of thermal energy supply as the humidity detected by said humidity detecting means increases.

* * * * *

UNITED STATES PATENT AND TRADEMARK OFFICE
CERTIFICATE OF CORRECTION

PATENT NO. : 5,160,399
DATED : November 3, 1992
INVENTOR(S) : Noriyoshi Ueda, et al.

It is certified that error appears in the above-identified patent and that said Letters Patent is hereby corrected as shown below:

COLUMN 3:

Line 17, "unit 7" should read --unit 17--.

COLUMN 11:

Line 44, "heating,," should read --heating,--.

COLUMN 12:

Line 35, "film, film" should read --film, said film--.

Signed and Sealed this

Eighth Day of February, 1994

Attest:

BRUCE LEHMAN

Attesting Officer     Commissioner of Patents and Trademarks